D. J. McCARTHY.
SIGNAL.
APPLICATION FILED AUG. 8, 1913.

1,194,758.

Patented Aug. 15, 1916.
9 SHEETS—SHEET 1.

WITNESSES
P. J. Holman
A. L. Vencill

INVENTOR
Daniel J. McCarthy
by Geo. E. Cruse
His Attorney

D. J. McCARTHY.
SIGNAL.
APPLICATION FILED AUG. 8, 1913.

1,194,758.

Patented Aug. 15, 1916.
9 SHEETS—SHEET 7.

WITNESSES

INVENTOR
Daniel J. McCarthy
by Geo. E. Cruse
His Attorney

D. J. McCARTHY.
SIGNAL.
APPLICATION FILED AUG. 8, 1913.

1,194,758.

Patented Aug. 15, 1916.
9 SHEETS—SHEET 8.

WITNESSES

INVENTOR
Daniel J. McCarthy
by Geo. E. Cruse
His Attorney

UNITED STATES PATENT OFFICE.

DANIEL J. McCARTHY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

SIGNAL.

1,194,758.

Specification of Letters Patent.  Patented Aug. 15, 1916.

Application filed August 8, 1913. Serial No. 783,719.

*To all whom it may concern:*

Be it known that I, DANIEL J. MCCARTHY, a citizen of the United States, residing at Wilkinsburg, in the county of Allegheny and State of Pennsylvania, have invented certain new and useful Improvements in Signals, of which the following is a specification.

My invention relates to signals, and particularly to signals of the type in which rays from a source of light are projected in a beam by suitable optical devices.

Signals embodying my invention are especially well adapted for use in connection with railway signaling.

One object of my invention is to prevent the signal being falsely caused to appear illuminated by rays from an outside source of light entering the signal and being projected back by the optical device or devices.

I will describe several forms of signals embodying my invention, and will then point out the novel features thereof in claims.

In the accompanying drawings.

Similar reference characters refer to similar parts in each of the several views.

Figure 1:
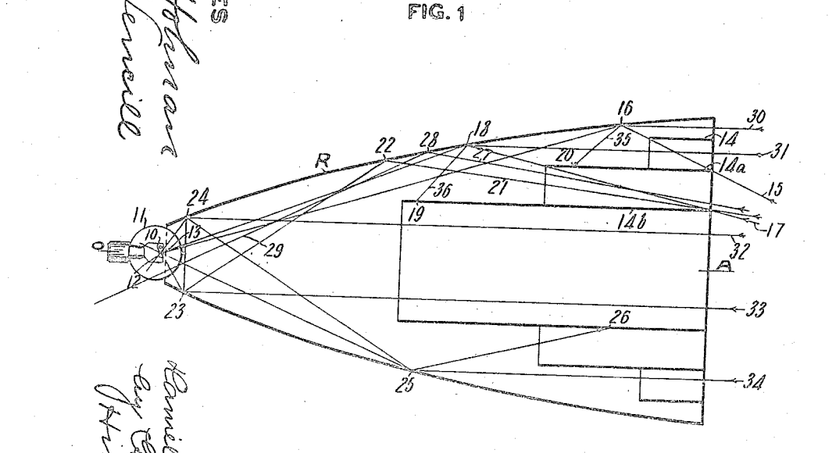
Figure 1 is a view showing in longitudinal section one form of signal embodying my invention and comprising a parabolic reflector provided with one arrangement of opaque screens.
Figure 2:
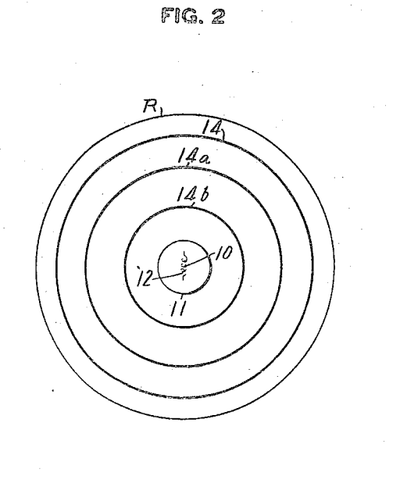
Fig. 2 is a view showing in front elevation the signal shown in Fig. 1.

Referring first to Fig. 1, R designates a reflector which, as here shown, is in the form of a paraboloid whose principal axis is in the line O—A, and whose focus is at point 10. Located adjacent the focus 10 is a source of light which, as here shown, is an incandescent electric lamp 11, having a filament 12 which is concentrated around the focus 10. It is well understood that all rays of light emanating from the focus 10 and striking the surface of reflector R are projected from the reflector in lines substantially parallel to the axis O—A, thus forming a beam of light parallel to the axis O—A.

When rays of light enter the reflector R from an outside source, such as from the sun or a locomotive headlight, and when such rays are parallel to the axis O—A, each such ray which strikes the interior surface of the reflector is projected so that it passes through the focus. If the reflector were a complete paraboloid, and if its entire interior surface were reflective, each of these rays from the outside source would, after passing through the focal point 10, again strike the surface of the reflector and be reflected back in a line parallel to the axis O—A, so that these rays also would form a beam of light parallel to axis O—A; and when the lamp 11 is extinguished, this beam might cause the signal to have the same appearance as though the lamp 11 were illuminated. In order to avoid such false indication due to rays parallel to the axis O—A, the reflector R is cut away from the apex to a circle cut by a plane passing through a point 13 a short distance from the focus 10 and on the opposite side of the focus from the apex. By means of this construction all rays of light from an exterior source which enter the reflector in lines parallel to the axis O—A will pass through the focus 10 and then pass out through the opening in the back of the reflector, hence these rays cannot cause the signal to falsely appear illuminated. Such rays are indicated, for example, by lines 30, 31, 32, 33, and 34.

In order to prevent false indications due to rays of light from an outside source which enter the reflector in lines not parallel to axis O—A, I provide one or more screens of opaque material so located as to intercept these rays. In Figs 1 I have shown three screens 14, 14$^a$ and 14$^b$, each in the form of a ring, which rings are concentrically arranged, the common center being in the axis O—A. These screens may be of any suitable opaque and thin material such as thin tin, and they may be mounted in the reflector in any suitable manner. Inasmuch as the rings are parallel to the axis O—A and are thin, they intercept only a very few of the rays of light from the lamp 12 which are projected in the beam from the reflector. These rings, as here shown, are so designed and located that all, or nearly all, rays from an outside source of light which may enter the reflector in lines not parallel to axis O—A are intercepted either before striking any point on the surface of the reflector or after striking one or more points on the surface and before being again projected out of the large end of the reflector. For example, if a ray should enter the reflector in line 15 between screens 14 and 14$^a$ it would strike the reflecting surface at point 16 from which it would be projected in a line 35 which strikes screen 14$^a$ at point 20 where the ray would be absorbed. Similarly, if a ray should enter the reflector in line 17 between screens 14$^a$ and 14$^b$ it would strike the reflecting surface at point 18 from which it would be projected in line 36, striking screen 14$^b$ at point 19, where it would be absorbed. If a ray should enter the reflector in line 21, it would strike the reflecting surface at point 22 from which it would be projected to point 23 then to point 24 and from there to point 25 from which it would be projected in a line which strikes screen 14$^b$ at point 26 where it would be absorbed. Obviously, certain rays which enter the reflector in lines nearly parallel to axis O—A will strike the reflecting surface and will pass out at the opening in the rear of the reflector; for example, a ray in line 27 would strike the reflecting surface at point 28 from which it would be reflected in line 29 which does not pass through the focus 10, but which does pass out through the opening in the rear of the reflector.

It will be seen from the foregoing that if the reflector and the opaque screens are properly designed the signal cannot be caused to falsely appear illuminated by light entering the signal from an outside source.

Figure 3:
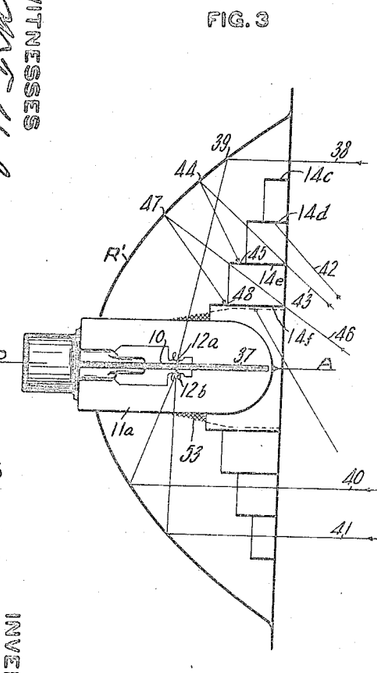
Fig. 3 is a view showing in longitudinal section another form of signal embodying my invention and comprising a parabolic reflector and another arrangement of opaque screens.
Figure 4:
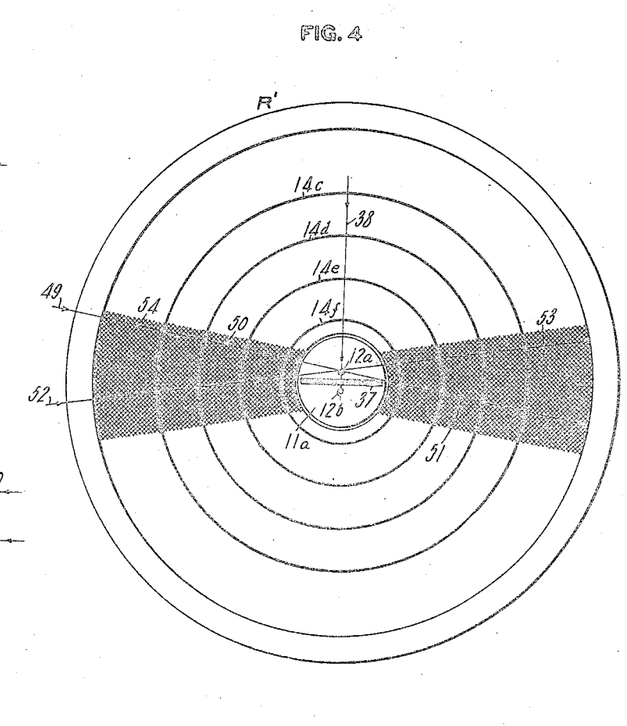
Fig. 4 is a view showing in front elevation the signal shown in Fig. 3.

Referring now to Figs. 3 and 4, the signal here shown comprises a paraboloidal reflector R' whose focus is at point 10. The source of light for this signal is an electric incandescent lamp 11$^a$ in which is a screen 37 of opaque material which screen, as here shown, is a thin flat plate which passes through the focus 10. The filament of the lamp 11$^a$ is divided into two parts 12$^a$ and 12$^b$, which are located on opposite sides of the screen 37 and which are concentrated as nearly as possible to the focal point 10. It will be seen that this screen 37 will intercept all rays of light from an outside source which enter the reflector and which are projected in lines which pass through the focus 10 or through points which lie in the screen 37. For example, ray 38, which is parallel to the axis O—A of the reflector, strikes the reflecting surface at point 39 and is projected in a line which passes through the focus 10, but this ray is intercepted by the screen 37. Rays 40 and 41 are similarly intercepted by the screen 37. In order to intercept all rays which would not be intercepted by screen 37, I provide rings 14$^c$, 14$^d$, 14$^e$, and 14$^f$ of opaque material which are similar to the corresponding rings in Figs. 1 and 2. A ray in line 42 strikes screen 14$^d$ and is absorbed thereby. A ray in line 43 enters the reflector between screens 14$^d$ and 14$^e$ and strikes the reflecting surface at point 44 from which it is projected to point 45 on screen 14$^e$ where it is absorbed. Similarly a ray in line 46 strikes the reflector at point 47 and is projected against the screen 14$^f$ at point 48 where it is absorbed.

In the form of signal shown in Figs. 3 and 4 it might be possible that rays of light entering the reflector from an outside source in lines substantially parallel to the axis O—A could pass near to the plate 37 without being intercepted by this plate, and could, therefore, be again projected out by the reflector. For example, referring to Fig. 4, ray 49 might enter the reflector and strike the reflecting surface at a point 50 from which it would be projected in a line which just misses the screen 37 and would strike the reflecting surface again at a point 51 from which it would be projected out of the reflector in a line nearly parallel to the axis O—A. A ray 52 might similarly be projected from the reflector in a line nearly parallel to axis O—A. To avoid this possibility I preferably blacken a portion of the reflecting surface as indicated at 53 and 54, the blackened portions being in the form of radial strips extending on each side of the plane of the screen 37.

Figure 5:
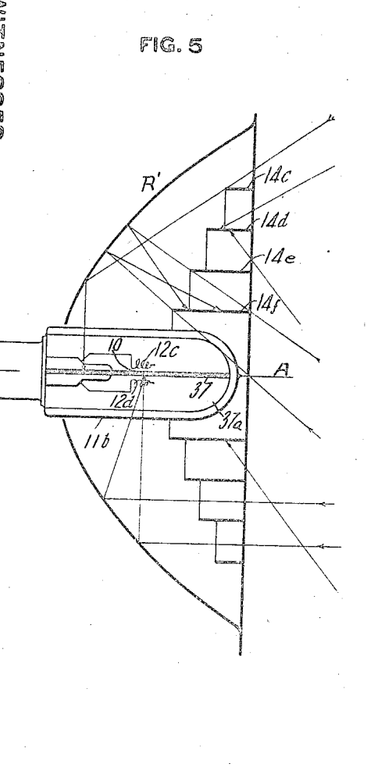
Fig. 5 is a view showing in longitudinal section a signal embodying my invention and having still another arrangement of opaque screens.
Figure 6:
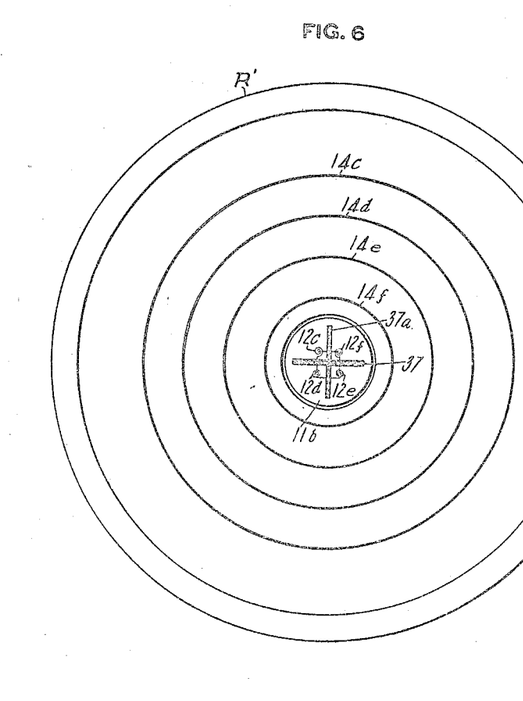
Fig. 6 is a view showing in front elevation the signal shown in Fig. 5.

Referring now to Figs. 5 and 6, the signal here shown is similar to that shown in Figs. 3 and 4, except that the lamp $11^b$ contains two opaque screens 37 and $37^a$ arranged in planes forming angles of 90° with each other. The line of intersection of these screens is coincident with the axis O—A and therefore passes through the focus 10. The filament of lamp $11^b$ is divided into four sections $12^c$, $12^d$, $12^e$, and $12^f$ each of which sections is concentrated and is located as nearly as possible to the focus 10. The four sections of the filament are located respectively in the four quadrants formed by the screens 37 and $37^a$, as clearly shown in Fig. 6. The two screens 37 and $37^a$ intercept all rays of light from an outside source which enter the reflector in lines parallel or nearly parallel to axis O—A, hence with this arrangement of screens it is unnecessary to blacken any portion of the surface of the reflector $R'$. The signal is provided with rings $14^c$, $14^d$, $14^e$, and $14^f$ of opaque material, as in Figs. 3 and 4, to intercept all other rays which enter the reflectors from an outside source.

Figure 7:
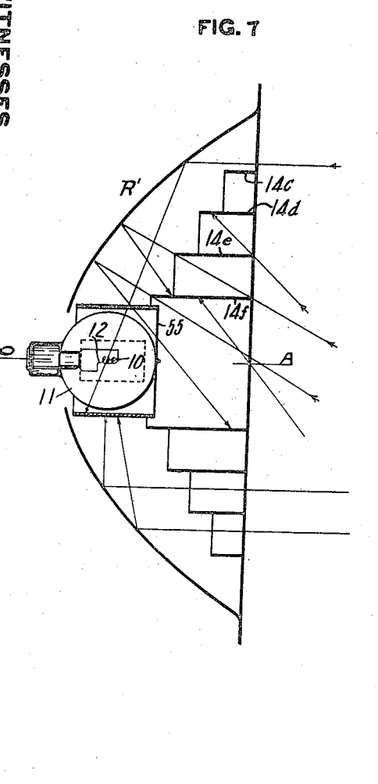
Fig. 7 is a view showing in longitudinal section a signal embodying my invention and showing still a different arrangement of opaque screens.
Figure 8:
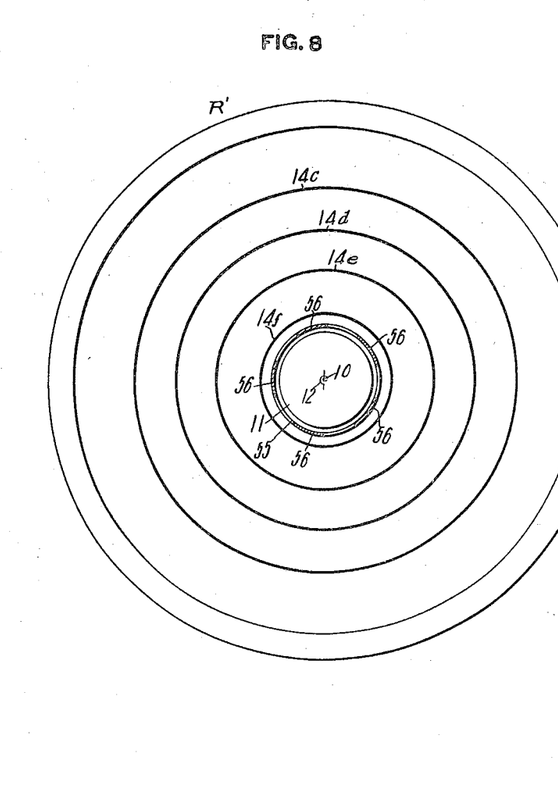
Fig. 8 is a view showing in front elevation the signal shown in Fig. 7.

Referring now to Figs. 7 and 8, the signal here shown is similar to that shown in Figs. 5 and 6, except that instead of the opaque screens in the electric lamp, I have shown a lamp 11 of a usual type, which lamp is surrounded by a cage 55 comprising slats 56 of opaque material alternating with open spaces, the slats being parallel with the axis O—A. The cage 55 is so designed that, considering the axis O—A as the center line, each point in an open space between slats is diametrically opposite to a point in a slat 56. This is clearly shown in Fig. 8. It will be seen that with this construction any ray of light from an outside source which enters the reflector in a line parallel to the axis O—A will be intercepted by a slat 56 either just before reaching the focus 10 or just after passing through this point. The signal is also provided with rings $14^c$, $14^d$, $14^e$ and $14^f$, as in the preceding views, to intercept all other rays from an outside source which enter the reflector.

Figure 9:
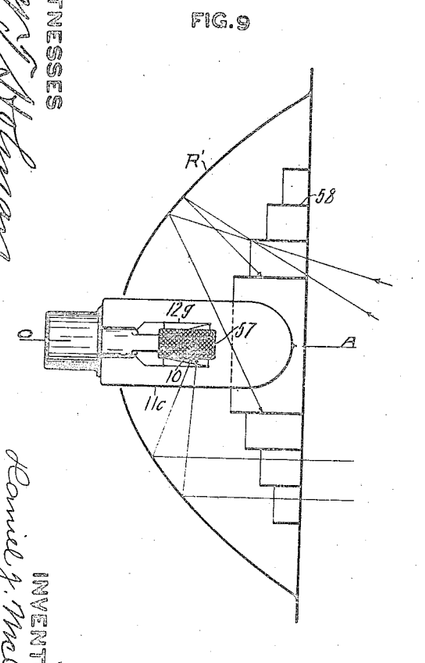
Fig. 9 is a view showing a signal embodying my invention and embodying still another form and arrangement of opaque screens.
Figure 10:
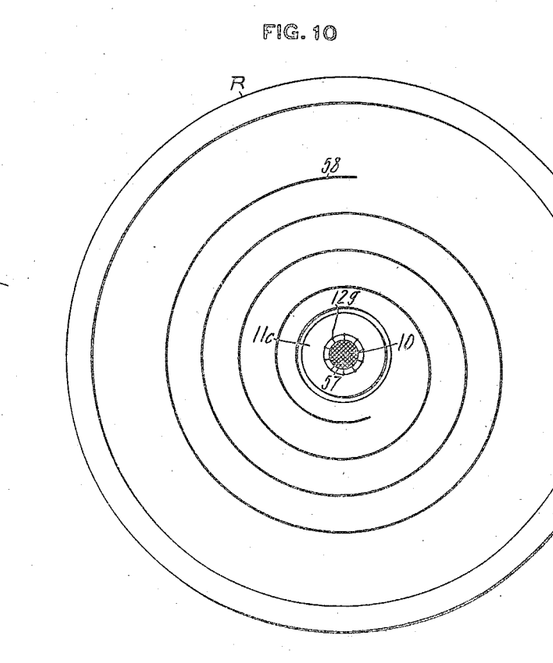
Fig. 10 is a view showing in front elevation the signal shown in Fig. 9.

Referring now to Figs. 9 and 10, the signal here shown comprises, as in the preceding views, a paraboloidal reflector $R'$ whose focus is at point 10. The source of light is an electric incandescent lamp $11^c$ having a circularly arranged filament $12^g$ which surrounds an opaque cylindrical member 57. This member 57 is so located that the focus 10 is in substantially the center line of the member. It will be seen that any ray of light from an outside source which enters the reflector $R'$ in a line substantially parallel to the axis O—A will be intercepted by the cylindrical member 57 before reaching the focus 10, hence such rays will not be again projected by the reflector. In the signal here shown I have illustrated another form of screen 58 for intercepting all other rays from an outside source, this screen being in the form of a spiral of thin opaque material. This spiral acts in the same manner as the rings $14^c$, $14^d$, $14^e$, $14^f$ in the signals shown in the preceding views. It is understood that either the spiral or the concentric rings may be employed in any of the signals here shown.

Figure 11:
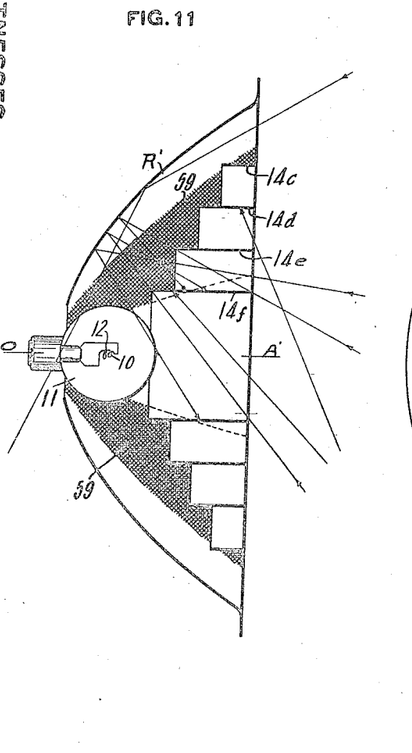
Fig. 11 is a view showing in longitudinal section a signal comprising a parabolic reflector having portions of its surface non-reflective and including one arrangement of opaque screens embodying my invention.
Figure 12:
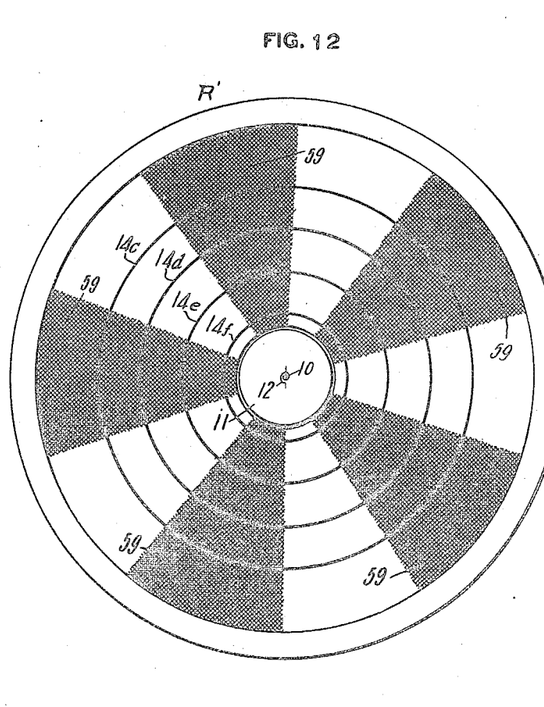
Fig. 12 is a view showing in front elevation the signal shown in Fig. 11.

Referring now to Figs. 11 and 12, the signal here shown comprises a reflector $R'$ whose principal axis is in the line O—A and whose focus is at point 10. The source of light is an incandescent lamp 11 whose filament 12 is concentrated around the focus 10. The inside surface of reflector $R'$ comprises alternate longitudinal or radial strips of reflective and non-reflective material, the former strips being shown in white in the drawing and the latter being shown darkened and designated 59. The non-reflective strips 59 may be the surface of the reflector covered with lamp black. The strips are so arranged that any straight line from any point in a reflective strip passing through the axis O—A will strike a point in a non-reflective strip. Hence it will be seen that any ray of light from an outside source which enters the reflector in such direction that it strikes a point on a reflective strip and is projected through the axis O—A will strike a point on a non-reflective strip and will be absorbed. This applies to rays parallel to axis O—A, and also to other rays which are projected through the axis O—A. To intercept all other rays from an outside source, I provide opaque rings $14^c$, $14^d$, $14^e$ and $14^f$ as hereinbefore explained. The non-reflective strips 59 are preferably slightly wider than the reflective strips, as shown in the drawing, to insure that all rays which strike a reflective strip near its edge and are projected through the axis O—A will then strike a point on a blackened strip.

Figure 13:
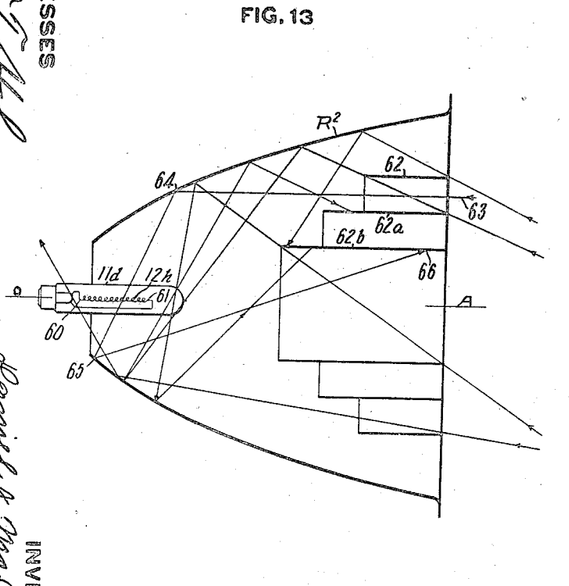
Fig. 13 is a view showing in longitudinal section another form of signal comprising a reflector formed of an infinite number of zones of infinitely small thickness and including one arrangement of opaque screens embodying my invention.
Figure 14:
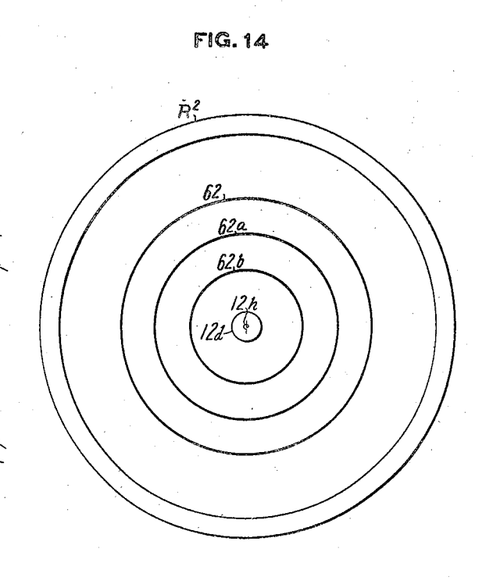
Fig. 14 is a view showing in front elevation the signal shown in Fig. 13.

Referring now to Figs. 13 and 14, the signal here shown comprises a reflector $R^2$ formed of an infinite number of zones of a paraboloid, each zone being of infinitely small thickness, the foci of which zones lie in the axial line O—A between points 60 and 61. The source of light is an incandescent lamp $11^d$ having a filament $12^h$ extended along the axial line between points 60 and 61, so that a source of light is located at the focus of each zone. With this construction, each ray of light from an outside source which enters the reflector in a line parallel to the axis O—A will be reflected from a point on one zone through the focus of that zone and will strike another zone from which it is projected in a line not parallel to axis O—A. To intercept these rays and prevent them leaving the reflector I provide opaque screens which, as here shown, are concentric rings 62, 62$^a$ and 62$^b$ and are similar to the rings shown in the preceding views. For example, a ray 63 parallel to axis O—A strikes the reflector first at point 64, then at point 65 from which it is projected in a line which strikes ring 62$^b$ at point 66 and is absorbed. All, or nearly all, rays from an outside source which are not parallel to axis O—A are also absorbed by one or another of the rings 62, 62$^a$ or 62$^b$ either before reaching the reflecting surface or after being reflected one or more times; this is clearly indicated by the lines shown in Fig. 13.

Figure 15:
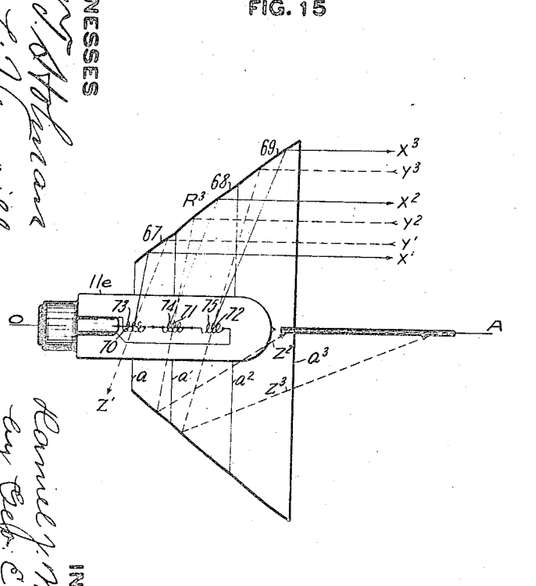
Fig. 15 is a view showing in longitudinal section another form of signal comprising a reflector formed of three zones having different focal points and including one form of opaque screens embodying my invention.
Figure 16:
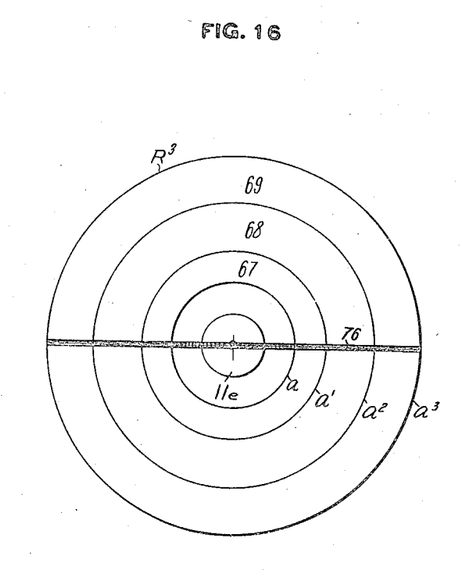
Fig. 16 is a view showing in front elevation the signal shown in Fig. 15.

Referring now to Figs. 15 and 16, the signal here shown comprises a reflector R$^3$ formed of three zones 67, 68 and 69, each of which is a frustum of a paraboloid and the axis of each of which zones is located in line O—A so that the foci of the several zones are also located on this line. The zones are bounded by circles $a$, $a'$, $a^2$, $a^3$, the planes of which are perpendicular to the axial line O—A. The focus of each zone lies outside of the portion of the line O—A included between the planes of the boundary circles of the corresponding zone; that is, the focus of zone 67 is point 70, which is a short distance to the left of the plane of circle $a$. The focus of zone 68 is at point 71, which is a short distance to the left of the plane of circle $a'$ and the focus of zone 69 is at point 72, which is to the left of the plane of circle $a^2$. Located at and adjacent each focus 70, 71, and 72 is a source of light which, as here shown, is a filament of an incandescent lamp 11$^e$, the filament being elongated and concentrated around the foci in three coils 73, 74 and 75. It is evident that with this construction all the rays of light from focus 70 which strike zone 67 are projected in lines parallel to the axis O—A; for example, ray X'. Similarly, the rays from focus 71 which strike zone 68 are projected in lines parallel to axis O—A; for example, ray X$^2$. Similarly, the rays from focus 72 which strike zone 69 are projected in lines parallel to axis O—A; for example, ray X$^3$. All rays of light from an outside source which enter the reflector R$^3$ in lines parallel to the axis O—A are either not reflected back through the large end of the reflector or are reflected back from a zone other than the zone which they strike upon entering the reflector, so that the rays which are thus reflected back through the large end are no longer parallel to the axis O—A. The example, ray Y' strikes zone 67 and is projected through focus 70 and passes out through the back of the reflector in line Z'. Ray Y$^2$ strikes zone 68 and after passing through the focus 71 of this zone strikes zone 67 from which it is projected in a line Z$^2$ which is not parallel to the axis O—A. Similarly, ray Y$^3$ strikes zone 69 and is projected through the focus 72 of this zone striking zone 68 from which it is projected in line Z$^3$ which also is not parallel to the axis O—A. In order to intercept all rays which enter the reflector in lines parallel to the axis O—A and are projected back through the large end of the reflector, I provide an opaque screen 76, which is located in the path of all such rays. It will be seen from the drawing that rays Z$^2$ and Z$^3$ are intercepted by this screen. As shown in Figs. 15 and 16 the screen 76 is in the form of a single plane, but it is understood that other forms of screens may be employed, such, for example, as the concentric rings or the spiral screen shown in the preceding views.

Figure 17:
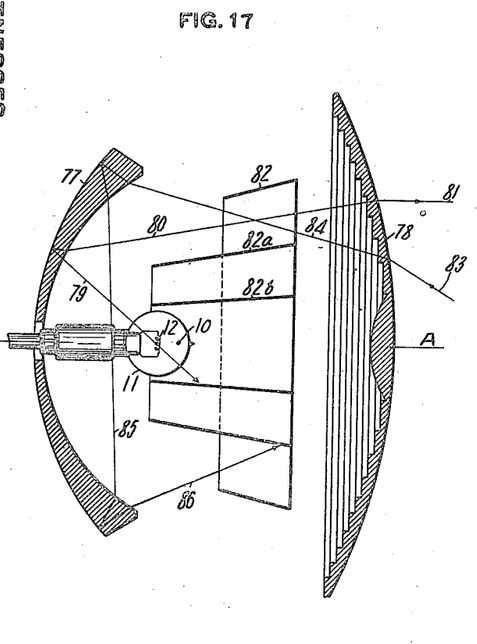
Fig. 17 is a view showing in longitudinal section another form of signal comprising a Mangin mirror and a lens and having one arrangement of opaque screens embodying my invention.
Figure 18:
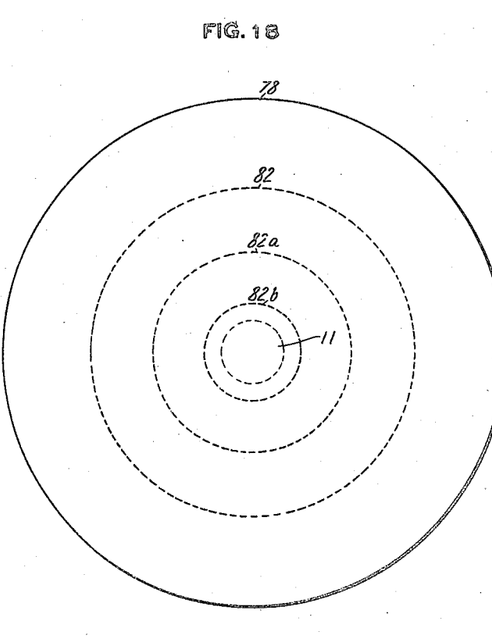
Fig. 18 is a view showing in front elevation the signal shown in Fig. 17.

Referring now to Figs. 17 and 18, the signal here shown comprises a Mangin mirror 77 whose focus is at point 10, and a lens 78 whose focus is at a point a considerable distance behind the mirror 77. The source of light is an electric incandescent lamp 11 having a concentrated filament 12, the lamp being so located that the filament 12 is between the mirror 77 and the focus 10 so that the rays of light from the filament 12 which strike the mirror 77 are projected in lines diverging somewhat from the axial line O—A. For example, ray 79 is projected from the mirror 77 in line 80. The lens 78 is so constructed and located that the rays thus projected from the mirror 77 after passing through the lens 78 are projected in lines substantially parallel to the axial line O—A, so that these rays then form a beam of light composed of substantially parallel rays. For example, the ray 80 after passing through the lens 78 is projected in line 81 which is parallel to the axial line O—A. In order to intercept all rays which enter the signal from an outside source of light, I provide suitable screens of opaque material, which, as here shown, are in the form of conical rings 82, 82$^a$ and 82$^b$. For example, a ray 83 from an outside source, after passing through the lens 78 is projected in line 84, and after striking the mirror 77 is projected in line 85 which is again projected by the mirror 77 in line 86 and is then intercepted by ring 82$^a$. Similarly, all or nearly all rays from an outside source of light entering the signal through the lens 78 are intercepted by one or another of the opaque screens 82, 82$^a$, 82$^b$. The opaque screens are so formed that they are parallel with the rays which emanate from the filament 12 and are projected by the mirror 77 so that these screens offer the least possible obstruction to the rays projected from the filament 12.

Signals embodying my invention are particularly adapted for use in railway signaling. When so used, a signal gives one indication when illuminated and another indication when extinguished. It will be seen that when a signal embodying my invention is used in this manner and when its lamp is extinguished, it cannot be caused by light from an outside source to falsely appear illuminated. Consequently, a signal cannot give a false indication due to light from an outside source.

Although I have herein shown and described only certain forms of signals embodying my invention, it is understood that various changes and modifications may be made therein within the scope of the appended claims without departing from the spirit and scope of my invention.

Having thus described my invention, what I claim is:

1. A signal comprising a source of light, optical means for projecting rays from said source, and means for preventing all rays which enter said signal from an outside source of light from being projected back by said optical means.

2. A signal comprising a source of light, optical means for projecting rays from said source, and opaque screens for preventing all rays which enter said signal from an outside source of light from being projected back by said optical means.

3. A signal comprising a source of light, optical means for projecting rays from said source in a beam of substantially parallel lines, and means for preventing all rays from an outside source of light which enter said signal at angles to said beam from being projected back by said optical means.

4. A signal comprising a source of light, a reflector for projecting rays from said source, and means for preventing all rays which enter said signal from an outside source of light from being projected back by the reflector.

5. A signal comprising a source of light, a reflector for projecting rays from said source, and opaque screens for preventing all rays which enter said signal from an outside source of light from being projected back by the reflector.

6. A signal comprising a source of light, a reflector for projecting rays from said source in a beam of substantially parallel lines, and rings of opaque material for preventing all rays from an outside source of light which enter said signal at angles to said beam from being projected back by the reflector.

7. A signal comprising a source of light, a reflector for projecting rays from said source in a beam of substantially parallel lines, means for preventing all rays from an outside source which enter said signal in lines parallel to said beam from being projected back by the reflector, and means for preventing all rays from an outside source which enter said signal at angles to said beam from being projected back by the reflector.

8. A signal comprising a source of light, a reflector for projecting rays from said source in a beam of substantially parallel lines, and means for intercepting all rays from an outside source of light which enter the reflector in lines substantially parallel to said beam.

9. A signal comprising a reflector having a focus, a source of light located adjacent the focus, and means located also adjacent said focus for intercepting all rays from an exterior source of light which enter said reflector and are projected in lines which pass through said focus and points adjacent said focus.

10. A signal comprising a reflector having a focus, a source of light located adjacent the focus, and means located also adjacent said focus for intercepting all rays from an exterior source of light which enter said reflector and are projected in lines which pass through said focus and points adjacent said focus, and opaque screens for intercepting all other rays from an exterior source which enter the reflector.

11. A signal comprising a reflector having a focus, an opaque screen passing through said focus for intercepting all rays of light from an outside source which enter the reflector and are projected toward another point on the surface of the reflector, and sources of light located on opposite sides of said screen and adjacent the focus.

12. A signal comprising a reflector having a focus, an opaque screen passing through said focus for intercepting all rays of light from an outside source which enter the reflector and are projected toward another point on the surface of the reflector, sources of light located on opposite sides of said screen and adjacent the focus, and other opaque screens for intercepting all other rays from an outside source which enter the reflector.

In testimony whereof I affix my signature in presence of two witnesses.

DANIEL J. McCARTHY.

Witnesses:
A. HERMAN WEGNER,
R. L. KISTLER.